(12) United States Patent
Schmit et al.

(10) Patent No.: US 10,150,925 B2
(45) Date of Patent: Dec. 11, 2018

(54) PRESSURISING OF BULK MATERIAL IN LOCK HOPPERS

(71) Applicant: Paul Wurth S.A., Luxembourg (LU)

(72) Inventors: Louis Schmit, Luxembourg (LU); Ben Muller, Strassen (LU)

(73) Assignee: PAUL WURTH S.A., Luxembourg (LU)

(*) Notice: Subject to any disclaimer, the term of this patent is extended or adjusted under 35 U.S.C. 154(b) by 0 days.

(21) Appl. No.: 15/508,217

(22) PCT Filed: Sep. 2, 2015

(86) PCT No.: PCT/EP2015/070086
§ 371 (c)(1),
(2) Date: Mar. 2, 2017

(87) PCT Pub. No.: WO2016/034644
PCT Pub. Date: Mar. 10, 2016

(65) Prior Publication Data
US 2017/0283720 A1 Oct. 5, 2017

(30) Foreign Application Priority Data

Sep. 3, 2014 (LU) .......................................... 92534

(51) Int. Cl.
*B65G 53/18* (2006.01)
*C10J 3/50* (2006.01)
(Continued)

(52) U.S. Cl.
CPC .............. *C10J 3/506* (2013.01); *B65G 53/12* (2013.01); *B65G 53/4616* (2013.01);
(Continued)

(58) Field of Classification Search
CPC .................................. B65G 53/18; B65G 53/22
(Continued)

(56) References Cited

U.S. PATENT DOCUMENTS 2,707,132 A * 4/1955 Baresch ................. B65G 53/12
406/132
3,144,176 A * 8/1964 Gronkvist .............. B65G 53/00
222/195

(Continued)

FOREIGN PATENT DOCUMENTS

| EP | 0202796 A2 | 11/1986 |
|---|---|---|
| WO | 9727135 A1 | 7/1997 |
| WO | 2004106199 A1 | 12/2004 |

OTHER PUBLICATIONS

International Preliminary Report on Patentability dated Dec. 12, 2016 re: Application No. PCT/EP2015/070086; pp. 1-4; citing: US 5 265 983 A, EP 0 202 796 A2, WO 97/27135 A1 and WO 2004/106199 A1.

(Continued)

*Primary Examiner* — Joseph A Dillon, Jr.
(74) *Attorney, Agent, or Firm* — Cantor Colburn LLP

(57) ABSTRACT

A process for pressurizing bulk material in a hopper; wherein the hopper is configured as a lock hopper (29) containing a bulk material, a source of pressurized gas, lines (22, 26, 28) to convey the pressurized gas from the source to one or more inlets (30) of the lock hopper, a valve arranged in the lines, wherein the opening position of said valve (34, 35) is controlled to provide pressurizing gas to the lock hopper at a preset constant gas volume flow rate.

12 Claims, 2 Drawing Sheets

(51) Int. Cl.
*B65G 53/12* (2006.01)
*B65G 53/46* (2006.01)
*B65G 53/66* (2006.01)

(52) U.S. Cl.
CPC ............... *B65G 53/66* (2013.01); *C10J 3/50* (2013.01); *C10J 2200/156* (2013.01); *C10J 2200/36* (2013.01)

(58) Field of Classification Search
USPC .............. 406/14, 136, 137, 168; 222/195; 239/143; 366/101
See application file for complete search history.

(56) References Cited

U.S. PATENT DOCUMENTS

| | | | | |
|---|---|---|---|---|
| 3,385,635 | A * | 5/1968 | Carlsen | B65G 53/22 406/109 |
| 3,776,599 | A * | 12/1973 | Reuter | B65G 53/12 222/195 |
| 4,391,860 | A * | 7/1983 | Rotolico | B01J 8/001 118/308 |
| 4,502,819 | A * | 3/1985 | Fujii | B65G 53/22 406/132 |
| 4,662,799 | A * | 5/1987 | Paul | B65G 53/12 406/14 |
| 4,784,533 | A * | 11/1988 | Teigen | B01J 8/003 110/245 |
| 4,792,235 | A * | 12/1988 | Paul | B01F 13/0244 222/195 |
| 5,071,289 | A * | 12/1991 | Spivak | B65D 88/70 406/11 |
| 5,265,983 | A | 11/1993 | Wennerstrom et al. | |
| 5,516,356 | A * | 5/1996 | Schmit | B01F 3/188 266/83 |
| 6,447,215 | B1 * | 9/2002 | Wellmar | B65G 53/66 406/11 |
| 6,494,645 | B1 * | 12/2002 | Seitz | B05B 7/1454 406/138 |
| 8,337,122 | B2 * | 12/2012 | Schultz | B65G 53/46 406/137 |

OTHER PUBLICATIONS

International Search Report dated Dec. 9, 2015 re: Application No. PCT/EP2015/070086; pp. 1-4; citing: US 5 265 983 A, EP 0 202 796 A2, WO 97/27135 A1 and WO 2004/106199 A1.

* cited by examiner

PRESSURISING OF BULK MATERIAL IN LOCK HOPPERS

TECHNICAL FIELD

The present invention generally relates to transporting bulk solid material, over larger distances, such as in so-called dense phase conveying, and/or against a considerable back-pressure.

BACKGROUND ART

In upstream pneumatic conveying lines transporting bulk solid material, especially pulverized material, over larger distances, particularly in so-called dense phase conveying, and/or against a considerable back-pressure at the outlet of the conveying line(s), the overpressure required in order to feed the bulk material into the line(s) may be significant.

In these circumstances, the inward transfer of the bulk material is commonly performed by means of hoppers designed as pressure vessels and usually called conveying hoppers, feed hoppers, blow tanks, etc. In the frequent cases where a continuous supply of bulk material to the downstream consumer is requested, at least two of those hoppers are provided, either in a serial arrangement or in a parallel arrangement.

In case of a serial arrangement, the first hopper is operated as a lock hopper, being cyclically filled from an upstream storage bin or similar, pressurized, emptied into the second hopper and finally depressurized or vented, whereas the second hopper is constantly maintained in overpressure conditions and continuously feeds the pressurized bulk material into the conveying line(s).

In case of a parallel arrangement, both hoppers are operated as lock hoppers in a "staggered parallel mode", i.e. are both cyclically filled, pressurized, emptied and depressurized, and alternately feed the pressurized bulk material into the conveying line(s), in such a way as to have a continuous supply of pressurized bulk material into this/these conveying line(s).

A typical example of lock hoppers operated as inward transfer equipment may be found in so-called Pulverized Coal Injection (PCI) Plants, supplying pulverized coal to blast furnaces. In those plants, operating overpressure levels of the hoppers in the range of about 5 bar g up to 20 bar g are common. Operating pressure levels of up to 30 bar g and more may be required e.g. in equipment feeding pulverized coal into coal gasifiers.

As described above, lock hoppers are thus operated batch-wise or discontinuously by alternative cycles of filling in bulk material while the lock hopper is depressurized, closing and pressurizing the hopper and opening the hopper's outlet to convey the bulk material into the pressurized conveying lines or, in the case of the above-mentioned serial arrangement into a second hopper constantly under pressure. Lock hoppers are thus very different from continuously operated so-called blow bottles, such as those described in U.S. Pat. No. 5,265,983. Indeed, such blow bottles being constantly operated under pressure require complex feeding devices often consisting of a cascade of pressure resistant feeding units with transitional zones under increasing pressure. Especially for systems operating at high pressures such blow bottles are either not usable at all or become too complex and unreliable.

Pressurizing of the bulk material inside the lock hopper is performed by injecting pressurized process gas into the bulk material. In case the bulk material is combustible, e.g. in case of pulverized coal, the process gas is usually inert (has a reduced content of oxygen) in order to prevent fire and explosion. Compressed nitrogen is commonly used in such cases. The amount of process gas needed to pressurize the bulk material inside the hopper is conditioned by the inner volume of the hopper, the overpressure level to be achieved, the filling level of the bulk material and the void fraction of the bulk material (ratio of void volume to total volume). Void fraction of bulk material can be large, 60% and more, so that a completely filled hopper may require an amount of pressurizing gas in the order of magnitude of an empty hopper.

Process gas for pressurizing each lock hopper is supplied through a pressurizing gas branch, connecting the process gas supply main of the inward transfer sub-plant to the lock hopper to be pressurized. In order to shorten the hopper cycle time and thus the required capacity and inner volume of this lock hopper, while avoiding peaks in process gas demand on supply main level, the process gas may be accumulated in a buffer vessel for pressurizing gas. The buffer vessel is continuously filled with pressurizing gas supplied from the supply main at a reduced flow rate, and then periodically, each time a lock hopper is to be pressurized, emptied at a large flow rate into the lock hopper. Depending on the pressure level of process gas supply and the operating pressure level in the lock hopper, it may make sense to install two buffer vessels instead of one, performing pressurizing of the lock hopper at a large flow rate in two stages, and only partly pressurize the lock hopper with pressurizing gas accumulated in the buffer vessel(s), while the complementary amount of pressurizing gas is directly supplied from the process gas supply main to the lock hopper.

An important aspect of such installations is that the initial difference in gas pressure between the process gas supply main or the buffer vessel and the lock hopper is generally so high that it would lead to initially very huge gas velocities leading to compacting the bulk material inside the lock hopper, thereby reducing its flowability and thus preventing the subsequent emptying of the hopper. So, although the time needed to pressurize the lock hopper should be kept as short as possible in order not to be a limiting factor in the downstream process in common plants, the initial flow rates in the pressurizing gas branches are generally limited.

A non-expensive and thus commonly used way to limit pressurizing gas flow rates is to fit the related pipeline with a Laval tuyere. While only producing a limit pressure loss, a Laval tuyere limits the gas mass flow rate to values strictly proportional to the gas absolute pressure upstream the tuyere. Which means that the pressurizing gas flow rate supplied from the process gas supply main through the branch into the lock hopper is constant, provided the gas pressure level in this main is constant, and that the pressurizing gas flow supplied from the buffer vessel is decreasing over time as the pressure level in that vessel is decreasing.

The main disadvantages of existing installations remain the too long duration needed for fully pressurizing bulk material in the lock hopper, the dimensioning of certain parts of the equipment to cope with initial pressurizing conditions and/or the noise nuisance during the process.

BRIEF SUMMARY

An enhanced way for pressurizing bulk material in so-called lock hoppers is provided herein, which process allows reducing the pressurizing time needed, resolving the above-mentioned dimensioning issue of the equipment and/or alleviating noise nuisances compared to existing processes and installations.

In order to overcome the above-mentioned problem, the present invention proposes, in a first aspect, a process for pressurizing bulk material in a hopper; wherein the hopper is configured as a lock hopper containing a bulk material, a source of pressurized gas, lines to convey the pressurized gas from the source to one or more inlets of the lock hopper and a valve arranged in the lines. The present process is operated in that the opening position of said (controllable) valve is controlled to provide pressurizing gas to the lock hopper at a preset constant gas volume flow rate.

Indeed, it has been found that by controlling the total gas volume flow rate to be constant in the pipelines, different advantages may be obtained. If the preset value is in the order of magnitude of the volume flow rates observed in conventional apparatuses with a Laval tuyere at the very beginning of the pressurizing process, the time for full pressurizing of a lock hopper can be significantly reduced. Indeed, with the present process operated at said preset values, the duration of the pressurizing can be shortened by up to about 70% in common installations (see details below). In this context it is noteworthy that this increase in pressurizing speed is obtained with installations having similarly dimensioned components (especially sintered metal discs) as conventional ones. Furthermore, this increased speed is obtained without increasing the risk of undesirable compacting of the material inside the lock hopper.

Alternatively, if the process is operated at a constant volume flow rate below the conventional initial volume flow rates, the process may offer further benefits, both in terms of wear and sizing of certain parts of the installation, as well as in terms of safety and health in the vicinity of the equipment.

In conventional installations, the pressurizing gas piping, including the sintered metal discs in the pressurizing gas injectors, has to be (over)sized for the unfavorable gas velocity conditions existing at the very beginning of the pressurizing process. Such sintered metal discs are usually installed in the pressurizing gas injectors on the lock hopper in order to prevent a back-flow of bulk material from the inner of the hopper into the pressurizing gas piping and to produce an appropriate distribution of the pressurizing gas into the bulk material to be pressurized. Thus, with the present process operated at a (lower) constant gas volume flow rate right from the beginning of the pressurizing step, i.e. when the pressure difference is at its maximum, the size (and the costs) of the sintered metal discs may be decreased. Furthermore, the reduced and constant gas volume flow rate is also a favorable element in the reduction of wear and maintenance of the piping.

Additionally (or alternatively), a reduced constant gas volume flow rate inside the lines may also significantly contribute to lessen noise nuisances generally associated with such equipment. So, measurable reductions in noise levels are achieved by the present appropriately operated process without taking further action, such as sound insulation, etc.

In the process as described herein the opening position of the valve may advantageously be controlled based on the actual velocity of the pressurizing gas measured downstream the valve using a volume flow rate or velocity measurement device.

Alternatively or additionally the opening position of the valve may also be controlled based on the volume flow rate of the pressurizing gas calculated based on actual upstream and downstream pressures measured using appropriate conventional pressure sensing devices during the pressurizing.

Additionally, a further line may be provided from the gas supply main to the one or more inlets of the lock hopper comprises a valve connected to a downstream Laval tuyere, which valve may be controlled to open during pressurizing, preferably by the end of the pressurizing when the pressure inside the buffer vessel drops to lower pressures.

The source of pressurized gas may be any appropriate source with a gas suitable for the intended use, such as air, a process gas or even an inert gas if the bulk material may react in the presence of oxygen. In practice, the source may thus be a gas supply main, such as an inert gas or process gas supply, and/or it may be an intermediate buffer vessel arranged between said valve and (fed/filled by) the gas supply main.

In a further aspect, the invention also considers the use of a valve and of a control unit capable of controlling the opening of said valve to provide pressurizing gas to a lock hopper at a preset constant gas volume flow rate in an apparatus for pressurizing bulk material in a hopper.

In particular, the invention concerns the above use for accelerated pressurizing bulk material in a hopper by choosing an appropriate preset gas volume flow rate value.

Alternatively, the use of a lower constant gas volume flow rate value may be advantageously chosen for reducing noise nuisances and/or wear in pressurizing bulk material in a hopper.

Alternatively or additionally, the use as described herein may be chosen for reducing bulk material compacting during pressurizing bulk material in a hopper.

Alternatively or additionally, the use as described may be envisaged for operating an existing apparatus for pressurizing bulk material in a hopper at higher pressure differential between pressurized gas source and unpressurized hopper without needing to re-dimension or replace parts of the apparatus, such as e.g. the injectors or sintered metal discs.

Alternatively or additionally, the use as described may be envisaged for operating an existing apparatus for pressurizing bulk material in a hopper at lower pressure differential between pressurized gas source and pressurized lock hopper without needing to re-dimension or replace major parts of the apparatus, such as e.g. the injectors or sintered metal discs.

In a still further aspect, the invention describes an apparatus for pressurizing bulk material in a hopper; comprising a hopper configured as a lock hopper for containing a bulk material, a source of pressurized gas, lines configured to convey the pressurized gas from the source to one or more inlets of the lock hopper, a valve arranged in the lines, wherein the apparatus is characterized in that said valve is a controllable valve, the opening position of which is controllable by a control unit, the control unit being configured to control the opening position of the valve in order to provide pressurizing gas to the lock hopper at a preset constant gas volume flow rate.

Preferably, the opening position of the valve is controllable by said control unit based on the actual volume flow rate of the pressurizing gas measured downstream the valve using a volume flow rate or velocity measurement device. Alternatively or additionally, the opening position of the valve is controllable by said control unit based on the volume flow rate of the pressurizing gas calculated based on actual upstream and downstream pressures measured using pressure sensing device(s) during the pressurizing.

As already mentioned above in the context of the present process, the source of pressurized gas may be a gas supply main and/or an intermediate buffer vessel arranged between the gas supply main and said valve.

In the context of the present invention, a volume flow rate of gas is considered constant if its value does fluctuate not by more than 10%, preferably not by more than 5%, during the time while at least 80% of the pressurizing gas amount needed, preferably 90% of that amount is supplied into the hopper.

BRIEF DESCRIPTION OF THE DRAWINGS

Preferred embodiments of the invention will now be described, by way of example, with reference to the accompanying drawing in which.

Further details and advantages of the present invention will be apparent from the following detailed description of several not limiting embodiments with reference to the attached drawing.

DESCRIPTION OF PREFERRED EMBODIMENTS

Figure 1:
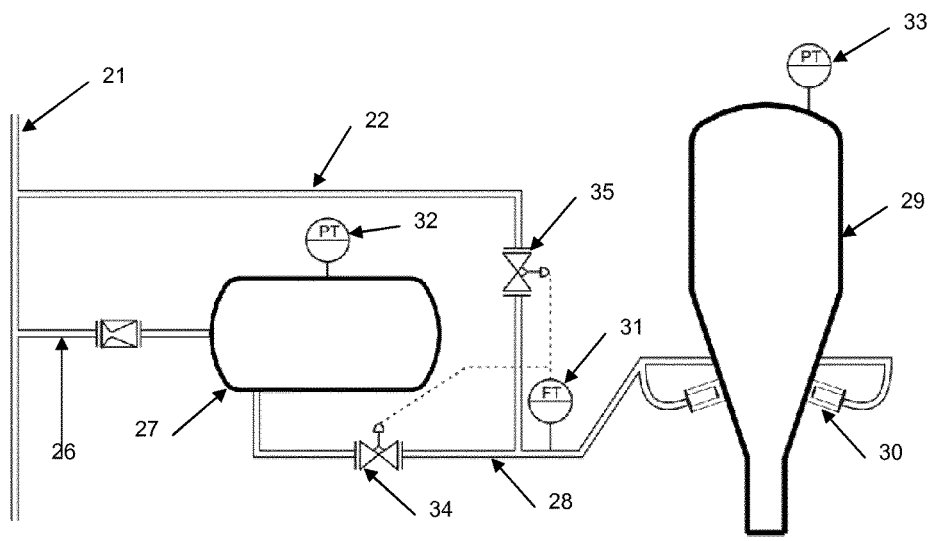
FIG. 1 is a schematic diagram of an embodiment of a preferred apparatus of the present invention or useable in a process of the present invention.

With reference to FIG. 1, an apparatus for pressurizing bulk material in a hopper configured as a lock hopper 29 is provided for containing a bulk material, such as coal powder. A number of lines 22, 26, 28 are provided to convey the pressurized gas from the source (directly or via a buffer vessel) to one or more inlets 30 of the lock hopper 29. A controllable valve 34, 35 is arranged in the lines and its opening position may be controlled by a control unit (not represented separately). This control unit is programmed to control the opening position of the valve in order to provide pressurizing gas to the lock hopper at a preset constant gas volume flow rate, thus producing constant pressurizing gas actual velocities in the piping, the sintered metal discs 30 and the bulk material inside the lock hopper 29.

The gas flow rate control valve (controllable valve) may be operated in two different ways, both ways resulting in the constant gas volume flow rate aimed at (both ways are represented in the same figure for illustration only):

Either a volume flow rate (or velocity) measurement 31 is installed in the pressurizing gas pipeline connecting the buffer vessel 27 to the lock hopper 29. A constant volume flow rate set point value is fixed. The flow rate controller (control unit) acts on the control valve 34, 35 in such a way as to make the actual volume flow rate value measured in the measurement 31 fit with the set point value.

Or, the characteristics of the control valve 34, 35, i.e. the mass flow rate produced by the valve depending on the pressure level measured upstream 32, the pressure level measured downstream 33 and the opening position of the valve, are included into the controller. For a fixed pressurizing gas volume flow rate and thus fixed pressurizing gas velocities, the corresponding mass flow rate value, conditioned by the pressure level measured in 33, is continuously computed. The controller positions the valve accordingly, in such a way as to produce a (continuously increasing) mass flow rate, the set point value for the valve position resulting from the pressure levels upstream 32 and downstream 33 and the mass flow rate value.

The pressurizing gas volume flow rate directly supplied from the process gas supply main 21 may be controlled in an equivalent way using controllable valve 35, the pressure upstream now being the pressure level in that process gas supply main. Though, whenever a buffer vessel for pressurizing gas is installed, the lowest pressure levels and thus the best effect of the pressurizing gas volume flow rate control as described is achieved when pressurizing gas is supplied from the buffer vessel.

Figure 2:
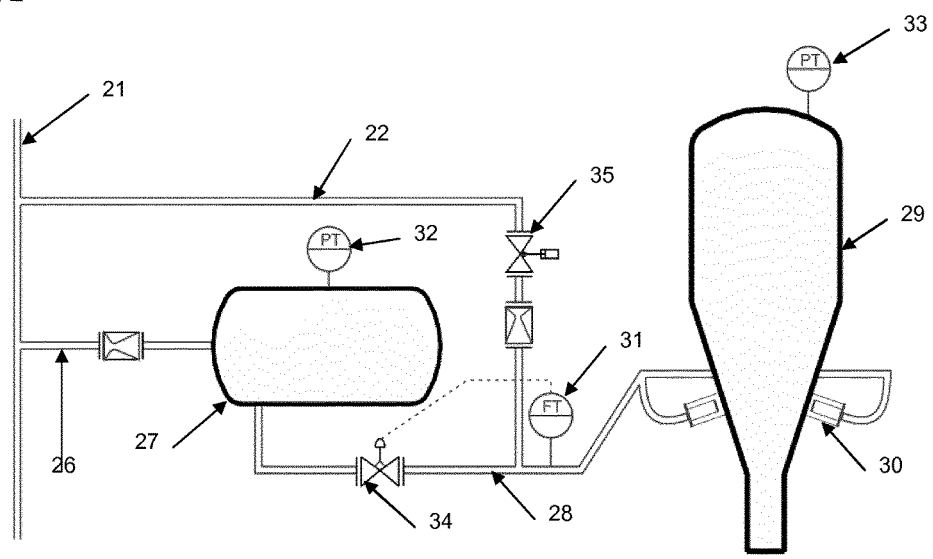
FIG. 2 is a schematic diagram of a further embodiment of a preferred apparatus of the present invention or useable in a process of the present invention and FIG. 3 is a graph showing lock hopper pressure and gas volume flow rate as a function of time during lock hopper pressurizing.

FIG. 2 shows an embodiment similar to that of FIG. 1, wherein valve 35 within line 22 from the main supply is however configured as a simple on/off (open/closed) valve with associated Laval tuyere. Such a configuration is especially useful if the lock hopper 29 is meant to be pressurized a priori/mainly from the buffer vessel 27. In case of failure of the buffer vessel circuit, the overall operation of pressurizing may then be done from the supply main in a conventional way.

In any case, valve 35 (be it the version of FIG. 1 or of FIG. 2) may be (controllably) opened by the end of the pressurizing cycle when the pressure inside the buffer vessel drops to lower pressures.

As an illustration of one of the embodiments of the present invention, the following calculation can be made: $p_1$ being the initial (absolute) pressure level in the lock hopper, $p_2$ the final (absolute) pressure level in the lock hopper, and pressurizing being performed either with constant mass flow rate (by means of a Laval tuyere with constant upstream pressure level) or with constant volume flow rate (by means of a valve controlled as described herein), the maximum actual gas velocity in case of constant mass flow rate pressurizing equaling the actual constant gas velocity in case of constant volume flow rate pressurizing, the ratio of pressurizing time durations of constant volume flow rate pressurizing versus constant mass flow rate pressurizing equals $\ln(p_2/p_1)/[(p_2-p_1)/p_a]$, $p_a$ being the (absolute) atmospheric pressure, ln the natural logarithm. Example: $p_1$=0 bar g=1 bar a, $p_2$=9 bar g=10 bar a, $p_a$=0 bar g=1 bar a. The ratio of pressurizing time durations becomes $\ln(p_2/p_1)/[(p_2-p_1)/p_a]$=0.256, i.e. the pressurizing time duration may be reduced by up to about 74% while the maximum actual gas velocity and the maximum pressure losses in the sintered metal discs as well as in the bulk material remain constant and the noise level remains close to constant (the noise level is primarily conditioned by the actual gas velocity and slightly increases with the logarithm of the pressure level).

Figure 3:
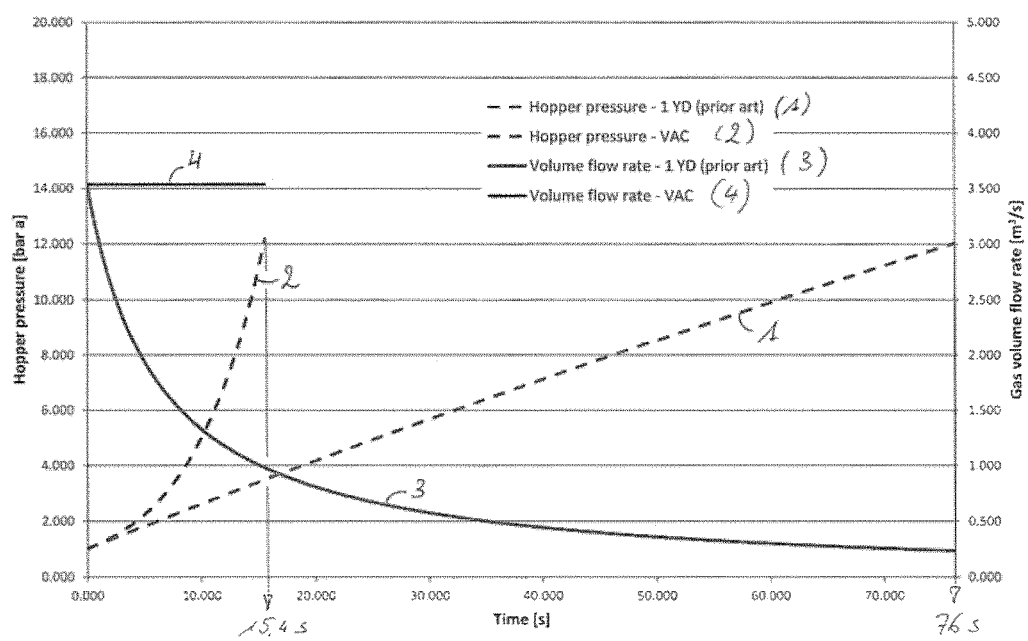

A corresponding illustrative example is also depicted in the graph of FIG. 3, wherein the results in terms of hopper pressure and gas volume flow rate are shown as a function of time for a pressurizing operation according to the present invention with a constant volume flow rate (VAC), curves (2) and (4), compared to a conventional operation using a valve and a Laval tuyere configuration (1YD), curves (1) and (3). The shown examples are based on the following assumptions: pressurizing gas vessel of 65 m³ useful volume and an initial pressure of 17 bar a; lock hopper to be pressurized having an available gas volume of 22 m³ and a final pressure of 12 bar a, maximum gas volume flow rate of 3.54 m³/s to be respected. As can be seen in FIG. 3, the reduction in time needed for pressurizing a lock hopper is hugely significant and surprising, from conventionally 76 s to merely 15.4 s, all the more so because these reductions may be achieved with only reduced modifications to existing apparatuses.

The present invention is not restricted to embodiments and to specific applications relating to injecting coal into a blast furnace. It may also be applied to other installations comprising pressurized hoppers containing powder materials and requiring periodic pressurization of said hoppers.

The invention claimed is:

1. A process for pressurizing bulk material in a hopper; wherein the hopper is configured as a lock hopper containing a bulk material, a source of pressurized gas, lines to convey the pressurized gas from the source to one or more inlets of the lock hopper, a valve arranged in the lines, wherein the process comprises
providing pressurizing gas to the lock hopper to pressurize the bulk material in the hopper; and
controlling the opening position of said valve to provide the pressurizing gas to the lock hopper at a preset constant gas volume flow rate,
wherein the opening position of the valve is controlled based
on the actual gas volume flow rate of the pressurizing gas measured downstream the valve using a volume flow rate or velocity measurement device and/or
on the gas volume flow rate of the pressurizing gas calculated based on actual upstream and downstream pressures measured using a pressure sensor upstream of the valve and a pressure sensor downstream of the valve during the pressurizing.

2. The process as claimed in claim 1, wherein the opening position of the valve is controlled based on the actual gas volume flow rate of the pressurizing gas measured downstream the valve using a volume flow rate or velocity measurement device.

3. The process as claimed in claim 1, wherein the source of pressurized gas is a gas supply main and/or an intermediate buffer vessel arranged between the gas supply main and said valve.

4. An apparatus for pressurizing bulk material in a hopper; comprising a hopper configured as a lock hopper for containing a bulk material, a source of pressurized gas, lines configured to convey the pressurized gas from the source to one or more inlets of the lock hopper, a valve arranged in the lines, wherein the apparatus is characterized in that said valve is a controllable valve, the opening position of which is controllable by a control unit, the control unit being configured to control the opening position of the valve in order to provide pressurizing gas to the lock hopper at a preset constant gas volume flow rate, wherein the opening position of the valve is controllable by said control unit based
on the actual volume flow rate of the pressurizing gas measured downstream the valve using a volume flow rate or velocity measurement device and/or
on the volume flow rate of the pressurizing gas calculated based on actual upstream and downstream pressures measured using a pressure sensor upstream of the valve and a pressure sensor downstream of the valve during the pressurizing.

5. The apparatus as claimed in claim 4, wherein the opening position of the valve is controllable by said control unit based on the actual volume flow rate of the pressurizing gas measured downstream the valve using a volume flow rate or velocity measurement device.

6. The apparatus as claimed in claim 4, wherein the source of pressurized gas is a gas supply main and/or an intermediate buffer vessel arranged between the gas supply main and said valve.

7. The apparatus as claimed in claim 4, wherein the control unit is configured to control the opening position of the valve in order to provide pressurizing gas through the lines at a preset constant gas volume flow rate.

8. The process as claimed in claim 1, wherein the process comprises controlling the opening position of said valve to provide pressurizing gas through the lines at a preset constant gas volume flow rate.

9. The process as claimed in claim 1, wherein the opening position of the valve is controlled based on the gas volume flow rate of the pressurizing gas calculated based on actual upstream and downstream pressures measured using a pressure sensor upstream of the valve and a pressure sensor downstream of the valve during the pressurizing.

10. The process as claimed in claim 1, wherein the opening position of the valve is controlled based
on the actual gas volume flow rate of the pressurizing gas measured downstream the valve using a volume flow rate or velocity measurement device, and
on the gas volume flow rate of the pressurizing gas calculated based on actual upstream and downstream pressures measured using a pressure sensor upstream of the valve and a pressure sensor downstream of the valve during the pressurizing.

11. The apparatus as claimed in claim 4, wherein the opening position of the valve is controllable by said control unit based on the volume flow rate of the pressurizing gas calculated based on actual upstream and downstream pressures measured using a pressure sensor upstream of the valve and a pressure sensor downstream of the valve during the pressurizing.

12. The apparatus as claimed in claim 4, wherein the opening position of the valve is controllable by said control unit based
on the actual volume flow rate of the pressurizing gas measured downstream the valve using a volume flow rate or velocity measurement device, and
on the volume flow rate of the pressurizing gas calculated based on actual upstream and downstream pressures measured using a pressure sensor upstream of the valve and a pressure sensor downstream of the valve during the pressurizing.

* * * * *